United States Patent [19]

Tokoh et al.

[11] Patent Number: 5,428,094

[45] Date of Patent: Jun. 27, 1995

[54] RESIN COMPOSITION

[75] Inventors: Makio Tokoh; Satoshi Hirofuji, both of Kurashiki, Japan

[73] Assignee: Kuraray Co., Ltd., Kurashiki, Japan

[21] Appl. No.: 140,263

[22] Filed: Oct. 21, 1993

Related U.S. Application Data

[63] Continuation of Ser. No. 755,794, Sep. 6, 1991, abandoned.

[30] Foreign Application Priority Data

Sep. 21, 1990 [JP] Japan .................. 2-253706

[51] Int. Cl.$^6$ .............................. C08K 5/05
[52] U.S. Cl. ..................... 524/379; 524/430; 524/433; 524/442; 524/444; 524/445; 524/446; 524/447; 524/449; 524/492; 524/493
[58] Field of Search ......... 524/442, 445, 446, 449, 524/379, 492, 493, 430, 433, 444, 447

[56] References Cited

U.S. PATENT DOCUMENTS

| | | | |
|---|---|---|---|
| 3,940,355 | 2/1976 | Engelbrecht et al. | 524/449 X |
| 3,976,618 | 8/1976 | Takida et al. | 260/40 |
| 4,002,590 | 1/1977 | Yoshida et al. | 524/442 |
| 4,162,238 | 7/1979 | Bergna | 524/442 |
| 4,212,956 | 7/1980 | Katsura | 525/60 |
| 4,235,835 | 11/1980 | Stutzman et al. | 524/445 |
| 4,255,490 | 3/1981 | Katsura | 428/483 |
| 4,325,858 | 4/1982 | Saito et al. | 524/449 X |
| 4,425,410 | 1/1984 | Farrell et al. | 428/516 |
| 4,506,056 | 3/1985 | Gaylord | 524/445 |
| 4,590,131 | 5/1986 | Yazaki et al. | 428/516 |
| 4,818,782 | 4/1989 | Bissot | 524/413 |
| 4,889,885 | 12/1989 | Usuki et al. | 524/449 X |
| 4,960,639 | 10/1990 | Oda et al. | 428/34.5 |
| 4,999,229 | 3/1991 | Moritani et al. | 428/36.6 |

FOREIGN PATENT DOCUMENTS

| | | |
|---|---|---|
| 2240932 | 3/1975 | France . |
| 53-121842 | 10/1978 | Japan . |
| 57-190047 | 11/1982 | Japan . |
| 61-242841 | 10/1986 | Japan . |
| 62-207338 | 9/1987 | Japan . |

*Primary Examiner*—Judy M. Reddick
*Attorney, Agent, or Firm*—Kramer, Brufsky & Cifelli

[57] ABSTRACT

A resin composition comprising an ethylene-vinyl alcohol copolymer (EVOH) having an ethylene content of 20 to 60 mol % and a water-swellable phyllosilicate, said water-swellable phyllosilicate being dispersed in the EVOH with a basal spacing satisfying the following condition (I)

$$(x-y) \geq 2 \qquad (I)$$

wherein x represents the basal spacing in angstrom of the water-swellalble phyllosilicate dispersed in EVOH and y represents the basal spacing in angstrom of dry powder of the water-swellable phyllosilicate.

The resin compositions of the invention are useful in the manufacture of plastic films and containers for food packaging.

5 Claims, No Drawings

RESIN COMPOSITION

This application is a continuation of application Ser. No. 07/755/794 filed Sep. 6, 1991 now abandoned.

BACKGROUND OF THE INVENTION

Field of the Invention

The present invention relates to a resin composition used for films or containers for packaging foods and the like and having high transparency, gas barrier property and processability. The present invention also relates to a process for producing the above resin composition and to a multilayered structure comprising at least one layer of this composition.

Description of the Prior Art

Metal cans, glass bottles, various plastic containers and the like have been used for packaging foods, medicines and like items. In recent years, plastic containers have become more wide-spread for packaging purposes because of their light weight, configurational flexibility, high shock resistance and low cost. Among the plastics used for packaging, ethylene-vinyl alcohol copolymer (hereinafter referred to as "EVOH") is a thermoplastic melt-processable resin having excellent gas barrier property, oil resistance and odor-keeping property as compared to other resins and has hence been suitably used in the form of shaped articles such as film, sheet and container, particularly for packaging foods.

EVOH however has the drawback that the properties of its shaped articles greatly change when ambient conditions such as humidity and temperature change and in particular their gas barrier properties are largely influenced by absorption of moisture and lower under highly humid conditions.

It is very important in practice to improve the above drawback. Thus, for example Japanese Patent Application Laid-open Nos. 1730,38/1985, 28661/1985 and 207338/1987 disclose that the moisture absorbency of EVOH is decreased by laminating a low-water-absorbent resin such as polyethylene or polypropylene onto an EVOH film or sheet; Japanese Patent Application Laid-open Nos. 21 91/1980 and 65378/1978 disclose improvement of resistance to moisture absorption by acetalization of the surface of an EVOH film or sheet; and Japanese Patent Application Laid-open No. 43554/1 989 (U.S. Pat. No. 4,818,782) discloses improvement of gas barrier property by incorporating water-nonswellable mica into EVOH in the nonaqueous or aqueous system.

The above method of lamination however requires a costly lamination operation and the laminated article obtained absorbs moisture gradually to lower the gas barrier property of EVOH, thus being far from substantial solution. Furthermore, with respect to retort treatment, which has been widely used in recent years, shaped articles from such laminate still absorb moisture when retorted, decreasing their gas barrier properties. The above method of acetalization newly requires a treatment process for the acetalization of EVOH that has once been formed into film or sheet, thus being economically disadvantageous. Incorporation of mica into EVOH should be in a large amount to ensure a sufficient gas barrier property and then gives compositions having opaque appearance.

U.S. Pat. No. 4,425,410 discloses melt kneading a drying agent such as bentonite with EVOH, thereby preventing the gas barrier property from deteriorating by retort treatment; and Japanese Patent Application Laid-open No. 242841/1986 discloses incorporating an inorganic filler such as non-water-swellable talc into EVOH to increase flexural modulus and thermal deformation temperature.

Japanese Patent Application Laid-open No. 253442/1989 (U.S. Pat. No. 4,999,229) discloses, for a multilayered structure comprising a layer of a blend of EVOH and polyamide or the like and a layer of a hydrophobic thermoplastic resin, incorporating a filler such as calcium silicate into the above blend layer. This literature however does not describe incorporation of such filler in the presence of water.

Further Japanese Patent Application Laid-open No. 308627/1 989 (U.S. Pat. No. 4,960,639) discloses, for a multilayered structure comprising a blend layer of EVOH and mica or the like and a blend layer of other thermoplastic resin and mica or the like, incorporating a filler such as calcium silicate into the above blend layer, but the patent equally fails to describe the incorporation being conducted in the presence of water.

SUMMARY OF THE INVENTION

Accordingly, an object of the present invention is to provide a resin composition having excellent gas barrier properties even under highly humid conditions without decreasing the good transparency inherent to conventional EVOH to a great extent.

Another object of the present invention is to provide a multilayered structure by utilizing ready laminatability of the above resin composition with other thermoplastic resin layer, which is very useful as packaging material for foods and the like.

The above object can be achieved by providing a resin composition comprising an ethylene-vinyl alcohol copolymer (EVOH) having an ethylene content of 20 to 60 mol % and a water-swellable phyllosilicate, said water-swellable phyllosilicate being dispersed in the EVOH with a basal spacing satisfying the following condition (I)

$$(x-y) \geq 2 \qquad (I)$$

wherein x represents the basal spacing in angstrom of the water-swellalble phyllosilicate dispersed in EVOH and y represents the basal spacing in angstrom of dry powder of the water-swellable phyllosilicate.

DETAILED DESCRIPTION OF THE PREFERRED EMBODIMENTS

The EVOH used in the present invention is, obtained, representatively, by saponifying an ethylene-vinyl acetate copolymer and has an ethylene content of 20 to 60 mol %, preferably 25 to 55 mol %. With an ethylene content of less than 20 mol %, the resistance to water and moisture decreases, the gas barrier property under highly humid conditions decreases, the resistance to stress cracking decreases and the good melt processability becomes difficult to maintain. On the other hand, with an ethylene content exceeding 60 mol %, the gas barrier property decreases although the resistance to water and moisture is improved. In both cases, the resultant EVOH's are not suited for packaging purposes. It is preferable that the saponification degree of vinyl acetate component be at least 95 mol %, preferably at least 98 mol %. If the saponification degree is less than 95 mol %, the thermal stability will become worse, thereby creating tendency to generate gels upon melt processing, and further the gas barrier property and oil resistance will decrease. Then, the EVOH cannot maintain its inherent characteristics or produce the effect of the present invention.

In the present invention, a silicon-containing EVOH having an ethylene content of 20 to 60 mol %, a saponification degree of vinyl acetate component of at least 95 mol % and a vinyl silane content of 0.0001 to 0.5 mol % can also be used. The vinyl silane can be introduced by using an olefinically unsaturated monomer containing silicon. Known monomers, such as those disclosed in Japanese Patent Application Laid-open No. 290046/1986 can be used for this purpose, and their examples are vinyltrimethoxysilane, vinylmethyldimethoxysilane, vinyltriacetoxysilane and vinyltripropionyloxysilane. The vinyl silane content is, while depending on the intended purpose, preferably 0.0001 to 0.5 tool%, more preferably 0.001 to 0.1 tool%.

The EVOH may have any melt index (determined at a temperature of 190° C. and under a load of 2160 g; hereinafter referred to as "MI") but has generally one of 0.1 to 50 g/10 min. Further the EVOH referred to in the present invention may have been modified with a small amount of a copolymerizable monomer. Examples of the modifying monomer are propylene, 1-butene, 1-hexene, 4-methyl-1-pentene, acrylates, methacrylates, maleic acid, phthalic acid, itaconic acid, higher aliphatic acid vinyl esters, alkyl vinyl ethers, N-vinylpyrrolidone, N-n-butoxymethylacrylamide, N-(2-dimethylaminoethyl)methacrylamide and quaternary compounds thereof and N-vinylimidazole and quaternary compounds thereof.

The water-swellable phyllosilicate used in the present invention and to be dispersed in EVOH is now described. The representative structure of the phyllosilicate is a multilayered phyllosilicate comprising a unit consisting of a layer of a sheet-like structure of Si-O tetrahedron and one of Al-O or Mg-O octahedron laminated with each other (hereinafter this unit is referred to as "flake"). The size of a flake, which is a unit constituting the phyllosilicate, has an average size of not more than 0.5 μm and the basal spacing, i.e. distance between adjacent flakes, is not more than 20 angstroms. The water-swellability as referred to herein of the water-swellable phyllosilicate is the property of incorporating water as a coordination compound, or absorbing water, to swell and in some cases allowing the flakes or parts thereof to disperse to form a colloid. In the present invention, it is very important that the phyllosilicate be substantially present in EVOH and in the form of fine particles obtained by partial separation and dispersion of its flakes utilizing its water-swellable characteristic.

Accordingly, in the resin composition of the present invention it is important that the basal spacing of a water-swellable phyllosilicate dispersed in EVOH satisfy the following condition (I)

$$(x-y) \geq 2 \qquad (I)$$

wherein x represents the basal spacing in angstrom of the water-swellalble phyllosilicate dispersed in EVOH and y represents the basal spacing in angstrom of dry powder of the water-swellable phyllosilicate. Here, x and y are determined by the measurement of basal spacing by X-ray diffraction method.

Further in the present invention, it is more effective that the water-swellable phyllosilicate be uniformly dispersed in EVOH. The condition of "uniform dispersion" herein means that no or only traces of local lumps are, with an optical microscope (magnification: 10) observed on the surface and cross section of a film obtained by melt casting an EVOH composition containing a phyllosilicate.

Examples of the water-swellable phyllosilicate are clay minerals such as smectite and vermiculite and synthetic micas. Concrete examples of smectite are montmorillonite, beidellite, nontronite, saponite, hectorite, sauconite and stevensite. These minerals may either be natural or synthetic. Preferred among the above is smectite, in particular montmorillonite. It is preferred for the purpose of uniform dispersion and incorporation into EVOH that the phyllosilicate used be in the colloidal state of aqueous sol. The above phyllosilicates may be used singly or in combination.

The phyllosilicate is contained in EVOH in an amount of 0.05 to 30% by weight based on the weight of EVOH, preferably 0.1 to 15% on the same basis, more preferably 1 to 10% on the same basis. If the content of the phyllosilicate is less than 0.05% by weight, the gas barrier property of the resulting composition will not be improved very much. On the other hand if the content exceeds 30% by weight, the melt viscosity will increase and the transparency Will decrease markedly, both of which are not preferred.

Next described is the process for dispersing a phyllosilicate uniformly and such that the above condition (I) is satisfied. It is, as described before, essential that the phyllosilicate used be substantially present in EVOH in the form of fine particles obtained by at least partial separation and dispersion of its flakes, and it is preferable that the fine particles be dispersed in EVOH such that no or only trace of lumps are observed with an optical microscope (magnification: 10), on the surface of a film prepared from the composition.

The above dispersion state is achieved, representatively, by mixing EVOH and a water-swellable phyllosilicate in the presence of water and then drying the mixture. More concretely, to a colloidal phyllosilicate dispersion in a dispersant of water is added an alcohol such as methyl alcohol, n-propyl alcohol or isopropyl alcohol and, if necessary, water, and then EVOH, the mixture is heated with stirring to dissolve EVOH, and the obtained dispersion is solidified by cooling, followed by crushing and drying to give pellets. As an alternative, EVOH is dissolved with heating in the above alcohol/water mixed solvent or the like, then a phyllosilicate is added to the solution and the resulting mixture is stirred, cooled to solid, followed by crushing and drying to give pellets. Or, the above EVOH solution is mixed and stirred with a colloidal phyllosilicate dispersion forming a sol in a dispersant of water, the above alcohol/water mixed solvent or the like, and the mixture is cooled to solid, followed by crushing and drying to pellets. Further, there may be employed a process which comprises first preparing by the above process an aqueous composition, such as an EVOH solution containing a phyllosilicate in a high concentration, and then further dissolving EVOH and kneading with it. Still further, an aqueous sol of a phyllosilicate may be added dropwise to a melt of EVOH at a temperature above its melting point to effect kneading using a melt kneader such as bent-type melt kneader. The drying of the mixture of EVOH and phillosilicate can be conducted either by forced system or by air drying, where it is preferred that the conditions be so selected as to minimize the amount of remaining solvent (water or water/alcohol).

On the other hand, with a process which comprises melting EVOH and kneading the melt with a dry clay mineral, which is a raw material of phyllosilicate, at a temperature above the melting point of EVOH and in the absence of water, the composition aimed at by the present invention cannot be obtained, since lumps of the clay mineral remain observed in EVOH.

The resin composition of the present invention may incorporate other thermoplastic resin, filler, drying agent, antistatic agent and the like, within limits not to impair the purpose of the present invention. Among these additives, incorporation of a drying agent is often desirable. Examples of the drying agent to be used are hydrate-forming salts, i.e. salts that absorb water as crystallization water; such as phosphates, e.g. sodium dihydrogenphosphate, disodium hydrogenphosphate, trisodium phosphate, trilithium phosphate and sodium pyrophosphate, and anhydrides of the foregoing, other hydrate-forming salts, such as sodium borate and sodium sulfate, and anhydrides thereof; other hygroscopic compounds such as sodium chloride, sodium nitrate, sugar and silica gel; and super-absorbent resins.

The resin composition of the present invention is used as a single-layer film or at least one layer, in particular intermediate layer, of multilayered structures, for solution coating purpose and the like. In forming films, the resin composition can be processed into films by known processes with no specific limitation. When used as at least one layer, in particular intermediate layer, of multilayered structures, the layer of the resin composition of the present invention can be laminated with any resin layer. Examples of the other resin used for the layer laminated are thermoplastic resins, in particular those having resistance to moisture absorption, e.g. polyolefins such as polyethylene, polypropylene and polybutene, copolymers principally containing an olefin, polystyrene, polyethylene terephthalate, polycarbonates, polyamides such as 6 nylon and 66 nylon, and mixtures of the foregoing. Polyethylene, polypropylene and their mixtures are particularly suitably used among the above resins.

The resin composition of the present invention can readily be laminated with the above thermoplastic resins. Lamination with these resins protects and reinforces the layer of the resin composition of the present invention and prevents its gas barrier property from deterioration under high humidity, as well as provides excellent mechanical properties.

Where interlayer bond strength between these resins and the resin composition of the present invention is insufficient, it is desirable to provide an adhesive resin layer. For this purpose any adhesive resin can be used insofar as it assures no delamination during use, and its preferred examples are olefinically modified polymers containing carboxyl groups, which are obtained by chemically, e.g. addition and grafting, bonding an unsaturated carboxylic acid or its anhydride to an olefin polymer such as polyethylene, polypropylene or polybutene or a copolymer principally containing olefin. Concrete examples of the adhesive resin are polyethylene modified by grafting maleic anhydride, polypropylene modified by grafting maleic anhydride, ethylene-ethyl acrylate copolymer modified by grafting maleic anhydride and ethylene-vinyl acetate copolymer modified by grafting maleic anhydride. These adhesive resins may be used singly or in combination, or, within a limit not to damage the effect of the present invention, may be mixed with EVOH.

Multilayered structures comprising at least one layer of the resin composition of the present invention can be prepared by any known process and its examples are co-extrusion, melt coating, extrusion lamination and dry lamination.

The resin composition of the present invention can be processed, as a single-layer or multilayered structure, into films, sheets, tubes, cups, bottles and the like, by known processes such as thermoforming, injection molding, blow molding and stretching blow molding. The shaped articles thus obtained are suitably used as containers for foods in general, foods for retorting and medicines.

Further in the present invention, the above-described aqueous composition containing as essential components EVOH, phyllosilicate and water may be casted into films, or formed into multilayered structures by coating on a base material (e.g. film, sheet and container such as cup or bottle), followed by drying. In this case the aqueous composition may be in the form of solution or dispersion. The solution is desirably obtained by the use of a solvent for EVOH, such as water/alcohol mixed solvent.

The haze as determined by JIS-K6714 of single-layer films obtained from the resin composition of the present invention is not more than 25%, generally not more than 20% and in most cases not more than 15%.

Other features of the invention will become apparent in the course of the following descriptions of exemplary embodiments which are given for illustration of the invention and are not intended to be limiting thereof.

In the Examples, various property items were measured according to the following methods.

(1) Melt index (MI)

Measured in accordance with ASTM D1238 65T and under 190° C. at a load of 2160 g.

(2) Oxygen permeability (OTR)

OX-TRAN 10/50 A was used and the OTR was measured at 20° C., 85% RH and 100% RH.

(3) Dispersibility

A film each was prepared from a specimen EVOH composition containing a phyllosilicate and its surface and section were observed with an optical microscope (magnification: 10) for aggregates or local lumps of the phyllosilicate.

(4) Transparency

A specimen film was measured for haze in accordance with JIS K6714 using a haze meter manufactured by Nihon Seimitsu Kogaku Co.

(5) Content of montmorillonite

Specimen EVOH pellets containing montmorillonite were calcined and the content was calculated from the weight of the residue.

(6) Basal spacing

X-ray diffractometer manufactured by Rigaku Denki Co. was used to test a film obtained by melt casting a specimen EVOH composition containing a phyllosilicate and the phyllosilicate powder treated at 50° C. for 48 hours in the air. The basal spacing of these were determined and the difference, x-y, of the two were calculated, wherein x is the basal spacing in angstrom of the water-swellalble phyllosilicate uniformly dispersed in EVOH and y is the basal spacing in angstrom of dry powder of the water-swellable phyllosilicate.

EXAMPLES

Example 1

A vessel with a stirrer was charged with water and 1 part of montmorillonite (Kunipia-F, made by Kunimine Kogyo Co.) to a concentration of 5% by weight, and the contents were stirred to give a colloidal montmorillonite. To this colloid added were 99 parts of an EVOH having an ethylene content of 32 mol %, a saponification degree of vinyl acetate component of 99.5 mol % and an MI of 4.4 g/10 min, methyl alcohol and water in such amounts as to adjust the concentrations of EVOH and methyl alcohol to 10% by weight and 65% by weight respectively. The mixture was heated with stirring to dissolve EVOH and give a mixture of montmorillonite and EVOH. The vessel containing the mixture was cooled in ice water to solidify the mixture and the solidified matter was crushed through a mixer and dried preliminary at 50° C. for a time and then at 105° C. for 12 hours. The thus dried matter was extruded through an extruder at 240° C. into pellets comprising the EVOH and montmorillonite. Part of the pellets thus obtained were then extruded through an extruder connected with a T-die at a die temperature and a cylinder temperature of both 230° C. to give a single-layer film. Separately, a 3-kind/5-layer multilayered sheet with an intermediate layer from the pellets was prepared through the combination of an extruder having a branched melt channel for inner and outer layers, an extruder for intermediate layer and an extruder having a branched melt channel for adhesive layers, and a T-die. The resins used for the molding were the above pellets for intermediate layer, polypropylene (Noblen PY220, made by Mitsubishi Petrochemical Co.) for inner and outer layers and a maleic anhydride-modified polypropylene (Admer QF500, made by Mitsui Petrochemical Industries., Ltd.). Temperatures of 230° C., 240° C., 230° C. and 240° C. were employed for the extruders for intermediate layer, inner and outer layers and adhesive layer and. T-die, respectively. The obtained multilayered sheet had a thick-ness construction of outer layer/adhesive layer/intermediate layer/adhesive layer/inner layer of 50/10/50/10/50 (microns).

The single-layer film and multilayered films thus obtained were tested for dispersibility of montmorillonite, transparency and basal spacing, and OTR, respectively. The results are shown in Table 1.

Example 2

Example 1 was repeated except for changing the amount used of montmorillonite and EVOH to 2 parts and 98 parts respectively, to obtain a single-layer film and a multilayered film. The thus obtained films were tested in the same manner as in Example 1. The results are shown in Table 1.

Example 3

Example 1 was repeated except for changing the amount used of montmorillonite and EVOH to 4 parts and 96 parts respectively, to obtain a single-layer film and a multilayered film. The thus obtained films were tested in the same manner as in Example 1. The results are shown in Table 1.

Comparative Example 1

Example 1 was repeated except that only the EVOH was used, i.e. without montmorillonite, to obtain a single-layer film and a multilayered film, which were tested in the same manner. The results are shown in Table 1.

Comparative Example 2

The same EVOH and montmorillonite as in Example 1 were used. After 98 parts of EVOH and 2 parts of montmorillonite had been mixed well in a Henschel mixer, the mixture was extruded through an extruder at a nozzle temperature of 230° C. and a cylinder temperature of 230° C. to form pellets. The pellets thus obtained were processed in the same manner as in Example 1 to form a single-layer film and a multilayered film, which were then evaluated in the same manner. The are shown in Table 1.

Comparative Example 3

The same EVOH as in Example 1 and a commercially available natural talc were used. After 98 parts of EVOH and 2 parts of the talc had been mixed well in a Henschel mixer, the mixture was extruded through an extruder at a nozzle temperature of 230° C. and a cylinder temperature of 230° C. to form pellets. The pellets thus obtained were processed in the same manner as in Example 1 to form a single-layer film and a multilayered film, which were then evaluated in the same manner. The results are shown in Table 1.

Comparative Example 4

The same EVOH as in Example 1 and a commercially available natural mica (non-water swellable) were used. After 98 parts of EVOH and 2 parts of the mica had been mixed well in a Henschel mixer, the mixture was extruded through an extruder at a nozzle temperature of 230° C. and a cylinder temperature of 230° C. to form pellets. The pellets thus obtained were processed in the same manner as in Example 1 to form a single-layer film and a multilayered film, which were then evaluated in the same manner. The results are shown in Table 1.

Comparative Example 5

Example 2 was repeated except for using an EVOH having an ethylene content of 64 mol %, a saponification degree of vinyl acetate component of 99.3 mol % and an MI of 25 g/10 min and changing methyl alcohol in a concentration of 65% by weight to n-propyl alcohol in a concentration of 80% by weight, to obtain a single-layer film and a multilayered film, which were then evaluated in the same manner. The results are shown in Table 1.

Comparative Example 6

Example 2 was repeated except for using an EVOH having an ethylene content of 18 mol %, a saponification degree of vinyl acetate component of 99.4 mol % and an MI of 25 g/10 min and changing the concentration of methyl alcohol to 45% by weight, to obtain a single-layer film and a multilayered film, which were then evaluated in the same manner. The results are shown in Table 1.

Comparative Example 7

Comparative Example 2 was repeated except for using bentonite instead of montmorillonite, to obtain a single-layer film and a multilayered film, which were then evaluated in the same manner. The results are shown in Table 1.

Example 4

The mixed liquid of montmorillonite and EVOH (containing water/methanol) obtained in Example 1 was laminated by glavure coating on the surface of a polypropylene film having provided with an anchor layer by coating polyurethane resin and then dried to obtain a multilayered film. The coating layer of the obtained film was evaluated for gas barrier property, dispersibility of montmorillonite and transparency. The results are shown in Table 1.

The basal spacing was determined as follows. A multilayered film was separately prepared by coating the mixed liquid on the surface of the same polypropylene film but without the anchor layer, followed by drying. The coating layer was then peeled off and subjected to test for basal spacing. The result is shown in Table 1.

Obviously, numerous modification and variations of the present invention are possible in light of the above teachings. It is therefore to be understood that within the scope of the appended claims, the invention may be practiced otherwise than as specifically described herein.

What is claimed is:

1. A resin composition comprising a saponified ethylene-vinyl acetate copolymer (EVOH) having an ethylene content of 20 to 60 mol % and a saponification degree of at least 95 mol % and at least one water-swellable phyllosilicate in an amount of 0.05 to 30 % by weight based on the weight of EVOH, said water-swellable phyllosilicate, in the form of an aqueous colloidal dispersion, having been uniformly dispersed in EVOH in the presence of water or water and an alcohol, with a basal spacing satisfying the following condition:

$$(X-Y) \geq 2$$

wherein X represents the basal spacing in angstroms of the water-swellable phyllosilicate dispersed in EVOH and Y represents the basal spacing in angstroms of the water-swellable phyllosilicate as a dry powder, said resin composition having substantially no localized aggregates which can be observed with an optical microscope (magnification: 10) on the surface of a film obtained therefrom.

2. A resin composition according to claim 1 wherein the phyllosilicate is a multilayered water-swellable phyllosilicate comprising a layer of a sheet-like structure of a Si-O tetrahedron and a layer of a sheet-like structure of Al-O or Mg-O octahedron.

3. A resin composition according to claim 2, wherein the water-swellable phyllosilicate is selected from the group consisting of smectite, vermiculite, synthetic micas, and mixtures thereof.

4. A resin composition according to claim 3, wherein the smectite is selected from the group consisting of montmorillonite, beidellite, nontronite, saponite, hectorite, sauconite stevensite and mixtures thereof.

5. A resin composition according to claim 4, wherein the water-swellable phyllosilicate is montmorillonite.

TABLE 1

| | EVOH | | | Inorganic substance | | OTR (cc · 20 μm/ m² · day · atm) | | Dispersibility | Transparency (%) | Difference in basal spacings (x − y) (angstrom) | Basal spacing (y) (angstrom) |
|---|---|---|---|---|---|---|---|---|---|---|---|
| | Ethylene content (mol %) | Saponification degree (mol %) | MI (g/10 min) | Kind | Content (wt %) | 85% RH | 100% RH*1 | | | | |
| Example 1 | 32 | 99.5 | 4.4 | Montmorillonite | 1.1 | 1.3 | 19 | ○ | 5.1 | 10 | 12 |
| Example 2 | 32 | 99.5 | 4.4 | Montmorillonite | 2.3 | 1.1 | 16 | ○ | 6.5 | 2.5 | 12 |
| Example 3 | 32 | 99.5 | 4.4 | Montmorillonite | 4.1 | 0.8 | 13 | ○ | 9.3 | 2.2 | 12 |
| Example 4 | 32 | 99.5 | 4.4 | Montmorillonite | 1.1 | 1.3 | 20 | ○ | 4.5 | 12 | 12 |
| Comparative Example 1 | 32 | 99.5 | 4.4 | — | — | 1.7 | 25 | ○ | 1.7 | — | — |
| Comparative Example 2 | 32 | 99.5 | 4.4 | Montmorillonite | 2.2 | 1.6 | 24 | x | 28 | 0 | 12 |
| Comparative Example 3 | 32 | 99.5 | 4.4 | Talc | 2.1 | 1.7 | 24 | x | 33 | — | — |
| Comparative Example 4 | 32 | 99.5 | 4.4 | Mica | 2.3 | 1.6 | 24 | x | 38 | — | 12 |
| Comparative Example 5 | 64 | 99.3 | 25.0 | Montmorillonite | 2.2 | 15 | 49 | △ | 8.1 | 0 | 12 |
| Comparative Example 6 | 18 | 99.4 | 1.2*2 | Montmorillonite | 2.1 | 0.3 | 62 | ○ | 6.0 | 0 | 12 |
| Comparative Example 7 | 32 | 99.5 | 4.4 | Bentonite | 2.2 | 1.7 | 24 | x | 34 | — | — |

*1○: No aggregates or local lumps are observed at all with an optical microscope.
△: Small aggregates and local lumps are observed with the naked eye.
x: Aggregates and local lumps are observed allover with the naked eye.
*2Measured at 210° C. under a load of 2160 g.